Oct. 22, 1946.  W. W. SMITH  2,409,964

STORAGE BATTERY

Filed Feb. 26, 1943

INVENTOR:
WILLIAM W. SMITH

BY
Augustus B. Stoughton
ATTORNEY

Patented Oct. 22, 1946

2,409,964

UNITED STATES PATENT OFFICE 2,409,964

STORAGE BATTERY

William Wharton Smith, Philadelphia, Pa., assignor to The Electric Storage Battery Company, a corporation of New Jersey Application February 26, 1943, Serial No. 477,218

8 Claims. (Cl. 136—179)

This invention relates to the design of storage battery cells, and, more particularly, to cells adapted for service in which the battery may be tilted at various angles from the vertical including complete inversion, the design being such as to prevent the escape of the liquid electrolyte in any such position of the cell. In the design of cells for such service it is recognized that a certain amount of gas is released from the plates in the cell, more especially while charging current is passing but also to an appreciable extent even while the battery is idle and on open circuit, and provision must be made to avoid the development of excessive gas pressure in the cell which may result in serious damage.

Two generally different forms of non-spill construction have been proposed. In one, a reservoir is provided in the top of the cell of sufficient size to hold all the free electrolyte, and a vent tube is so located that its inner end is never submerged in the electrolyte in any position of the cell, thus providing for the escape of gas in any such position. This design has the advantage of allowing the inversion of the cell for any length of time without developing excessive gas pressure. It is, however, subject to several disadvantages. The provision of the additional reservoir for electrolyte in the inverted position adds considerably to the weight of the cell, and, as usually constructed, the cell terminal posts must pass through the reservoir, adding further weight and reducing the terminal voltage of the cell on account of the increased IR drop in the posts. In the inverted position, the electrolyte is no longer between the plates and the cell can give only a fraction of its normal output. As usually designed, the adjustment of electrolyte level is very critical to insure that the inner end of the vent tube shall never be submerged.

In the other design of non-spill construction, the cell is of normal dimension, and a special design of vent plug is furnished having a gravity-operated valve which closes to prevent the escape of electrolyte when the cell is tilted beyond a predetermined angle from the vertical. These designs, of which many have been proposed, avoid the disadvantages of the enlarged electrolyte reservoir above cited but are subject to the disadvantage that, when the valve in the vent is closed by the tilting of the cell, no escape for gas is provided. This construction is satisfactory only for service in which the duration of the abnormal position of the cell is so short that abnormal pressure will not be developed before the normal position is restored and the vent valve is released.

This invention is directed to the elimination of the disadvantages of previous designs of non-spill storage battery cells above cited, and has, therefore, for its objects:

1. To provide a non-spill feature which will permit the development of a considerable volume of gas in the cell while the normal vent opening is closed without producing excessive or injurious gas pressure.
2. To provide a non-spill feature which may be applied to cells of standard design with but slight and inexpensive modifications.
3. To provide a non-spill feature which will add but an insignificant amount of the weight to the cell.
4. To provide a non-spill design which, when the cell is inverted, will retain the greater part of the electrolyte between the plates and thus cause but little reduction in the available output.
5. To provide a non-spill feature which is inexpensive to manufacture and apply.
6. To provide a non-spill feature which, by minor changes in design, may be readily adapted for different service conditions.

With these and other objects in view, which will be apparent as the description proceeds, the invention comprises the combination with a storage battery cell of standard design having a gravity-operated valve in the vent plug, of a reservoir supported externally of the cell and communicating with the interior of the cell through an auxiliary opening in the cover or container wall and arranged to receive electrolyte or gas or both when the cell is tilted or inverted to receive any excess gas pressure which may develop and to return to the cell any such electrolyte when the cell is restored to normal position.

This invention will be better understood by reference to the following description taken in connection with the accompanying drawing in which.

Figure 1:
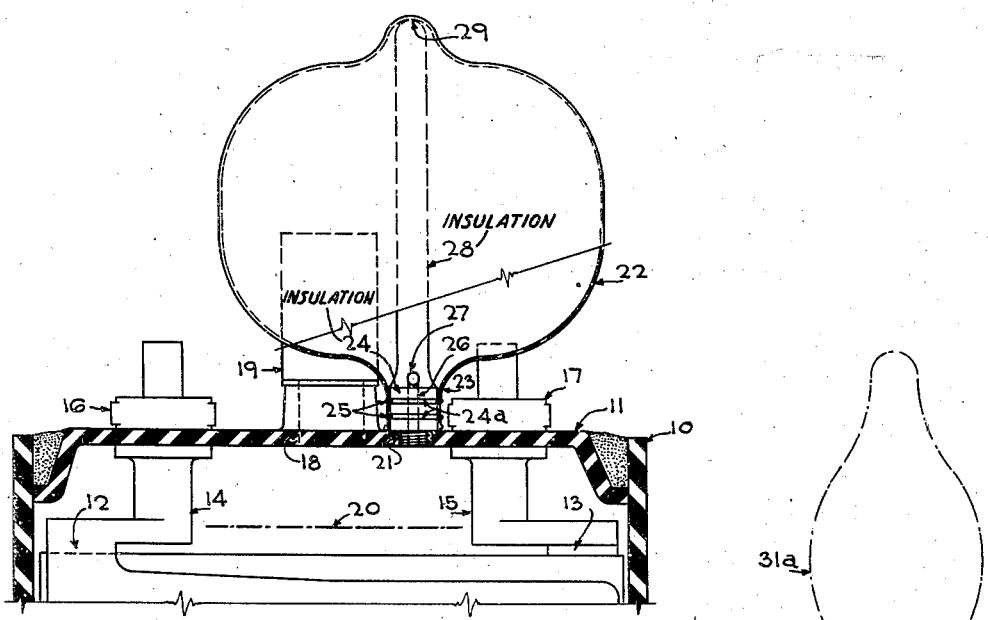
Figure 1 shows in elevation, partly in section, the upper part of a storage battery cell provided with a reservoir embodying features of the invention.
Figure 2:
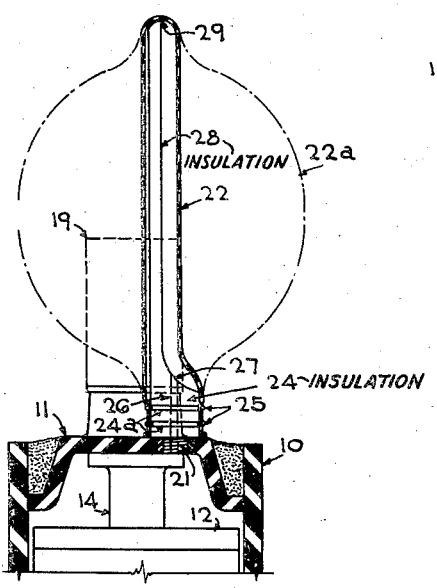
Figure 2 is a view of the structure of Figure 1 taken at right angles to that of Figure 1.

Referring to Figures 1 and 2, the numeral 10 represents the wall of a storage battery container provided with a cover 11. Within the container are shown the usual positive and negative plate groups 12 and 13 with their corresponding terminal posts 14 and 15 passing through the cover 11 to which they are bolted by the threaded nuts 16 and 17. These details are in accordance with standard design and need no further explanation.

The cover is provided with a filling and venting opening 18 into which is fitted a non-spill vent plug 19 which may be of one of the well known types, such as disclosed in Patents Nos. 2,065,783 and 2,185,098 issued to J. Lester Woodbridge and assigned to the assignee of this invention, in which a valve operated by gravity is held open, to permit the escape of gas when the cell is in its normal upright position but is automatically closed by gravity or by a resilient member to prevent the escape of electrolyte when the cell is tilted beyond a certain angle from the vertical or is completely inverted. The details of design of this vent plug form no part of this invention provided it functions as above described, and are therefore omitted. The normal electrolyte level is indicated at 20.

The cover 11 is provided with a supplementary orifice 21 in communication with which is an auxiliary reservoir 22. The reservoir may be of any suitable size and shape and either self-supported or supported by separate means. In the preferred embodiment of this invention, shown in Figures 1 and 2, the reservoir is in the form of a collapsible pouch or bag of flexible elastic material, such a soft rubber, which, in its normal condition, is more or less flat in one direction, as shown in Figure 2, and round or oval in the other directions, as shown in Figure 1. By the use of a collapsible member, a reservoir of varying capacity is provided which is adapted to operate under varying conditions in the cell. Moreover, as pointed out more fully hereinafter, the use of a collapsible construction facilitates the operation of the auxiliary reservoir.

As shown in Fig. 1, the collapsible reservoir 22 is provided with a depending neck 23 which fits snugly around a nipple 24 threaded into the orifice 21. The neck portion 23 is secured to the nipple 24 by suitable clamping members 25 which compress portions of the neck into the grooves 24a provided in the nipple, thereby producing a gas and liquid-tight seal. Centrally located in the nipple 24 is an axial duct 26 which communicates with the interior of the cell above the electrolyte and with the interior of the reservoir as at 27. Integrally formed on the nipple 24 is an extension 28 in the form of a comparatively narrow strip which projects upwardly and into a recess 29 formed at the top of the reservoir. The extension 28 serves to support the collapsible reservoir 22 in the position shown in Figures 1 and 2 and the recess 29 tends to prevent lateral shifting of the reservoir. The nipple 24 and the integral extension 28 may be made of any suitable rigid material resistant to attack by the electrolyte, such as hard rubber or a suitable synthetic resin, for example, "Polystyrene."

The operation of the foregoing construction is at follows:

When the cell is in its normal upright position with the valve in the vent cap 19 open, no gas pressure will be developed in the cell and the reservoir 22 will remain in its collapsed condition. When the cell is tilted beyond a predetermined angle, the valve in the vent plug 19 will close to prevent the escape of electrolyte. If, under these conditions, gas is evolved in the cell, as will usually occur, the excess gas will pass into the reservoir 22, inflating it, as shown by the dotted line 22a in Figure 2. The increase in gas pressure required to produce this inflation may be limited to a harmless value by the design of the reservoir as to dimensions and material in relation to the expected rate of gas evolution during the period of time for which provision must be made during which the valve in the vent plug 19 is closed.

If the cell is more or less completely inverted, electrolyte will pass into the reservoir instead of gas, but the result will be substantially the same, inasmuch as the inflation of the reservoir 22 will provide increased space to accommodate the evolution of gas.

When the cell is restored to its normal upright position, the valve in vent plug 19 will open and any gas pressure will be relieved and any electrolyte in the reservoir 22 will be returned to the cell, the elasticity of the reservoir restoring it to its initial collapsed condition.

It will not be necessary to provide space in the reservoir for the entire volume of electrolyte but only sufficient space to provide for the volume of gas that will be released from the plates while the cell is inverted. Thus the greater part of the electrolyte will remain between the plates and the output of the cell will not be seriously reduced.

Figure 3:
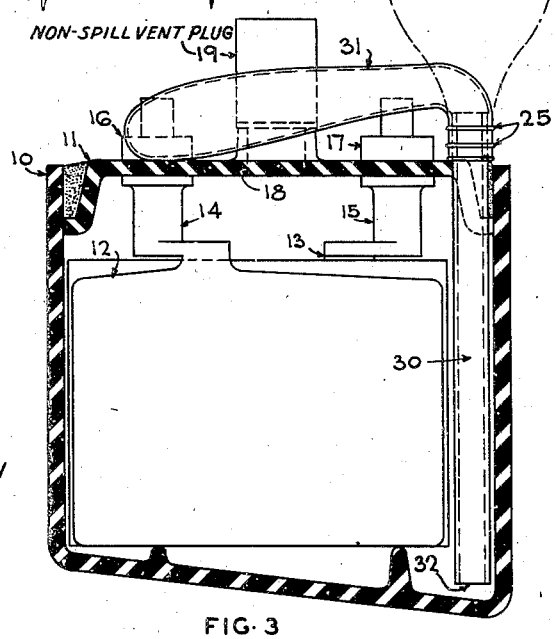
Figure 3 is an elevation, partly in section, showing a modification.

In Figure 3 a modification is shown in which the tubular duct 30, corresponding to the duct 26 in Figure 1, extends from its point of communication with the interior of a collapsible auxiliary reservoir 31 downwardly through the cover 11 into the cell to a point 32 near the bottom. Thus, when the cell is inverted, the point 32 will be surrounded by gas rather than electrolyte, and very little, if any, electrolyte will pass into the reservoir 31.

As here shown, the reservoir 31, in its collapsed condition, is more or less cylindrical in shape and lies on the top of the cell, but as gas pressure develops in the cell after inversion, this reservoir will be inflated to a more or less oval shape and an upright position, as shown in dotted lines at 31a.

In Figure 3 the inner surface of the bottom of the container is shown sloping downwardly toward the lower end 32 of the tubular support 30 to reduce the amount of surplus electrolyte under the plates and still provide adequate space for gas about the point 32 when the cell is inverted or partially inverted, the design being especially adapted for service in which the angular displacement of the cell from the vertical will always or usually be in the same direction; for example, in the counter-clockwise direction in the case of the design illustrated in Figure 3.

It will be understood that the cylindrical form of collapsible reservoir shown in Figure 3 may be substituted for that illustrated in Figures 1 and 2, with the omission of the upwardly projecting strip 28, without altering the other features of design embodied in Figures 1 and 2, so that, in its collapsed condition, the reservoir will lie prone on the top of the cell, as shown in Figure 3. This may prove more convenient if the battery has to be frequently moved to different locations. Moreover, while each of the specific embodiments illustrated shows a collapsible reservoir, it is to be understood that a suitable rigid reservoir of appropriate proportions to accommodate the gases or electrolyte released under tilted or inverted operations could be employed without departing from the spirit of this invention. The collapsible reservoir is preferred for the reasons already set forth.

It will be noted from the above description that the device of this invention may be applied to a cell of standard design without modification except for the provision of the supplementary orifice in the cover. It provides for a considerable evolution of gas from the plates while the valve in the non-spill vent plug is closed, without developing harmful gas pressure in the cell. The device adds but little to the weight of the standard cell, is inexpensive to manufacture and apply.

While specific embodiments of this invention have been illustrated and described modifications thereof will occur to those skilled in the art and it is, therefore, included to cover by the appended claims all such modifications as come within the time, spirit and scope of this invention.

I claim:

1. In combination, a storage battery cell assembled in a hermetically sealed container, a non-spill vent plug for said cell embodying a valve automatically closed by the tilting of the cell to a predetermined angle from the vertical, and a collapsible reservoir bounded by flexible resilient walls, said reservoir supported externally to the cell and provided with a duct communicating with the interior of the reservoir and the interior of the cell.

2. In combination, a storage battery cell assembled in a hermetically sealed container, a non-spill vent plug for said container embodying a valve automatically closed by the tilting of the cell to a predetermined angle from the vertical, and a collapsible reservoir bounded by flexible resilient walls, said reservoir supported externally to the cell and provided with a duct communicating with the interior of the reservoir and the interior of the cell at a point adjacent the bottom of the cell.

3. In combination a storage battery having positive and negative plate groups in a container and a cover hermetically sealed to said container, a filling opening in said cover, a non-spill vent plug removably secured in said filling opening embodying a valve automatically closed by the tilting of the battery to a predetermined angle from the vertical, a second opening in said cover, a collapsible auxiliary reservoir supported externally to the cell on said cover adjacent said second opening, and a duct removably secured in said second opening for connecting the interior of said container and the interior of the reservoir whereby upon tilting of said battery and the closing of the valve of said non-spill vent, pressure created in said container from the charging or discharging of the battery may be relieved by said auxiliary reservoir.

4. In combination a storage battery having positive and negative plate groups in a container and a cover hermetically sealed to said container, a filling opening in said cover, a non-spill vent plug removably secured in said filling opening embodying a valve automatically closed by the tilting of the battery to a predetermined angle from the vertical, a second opening in said cover, a collapsible auxiliary reservoir, a duct removably secured in said second opening adapted to connect the interior of said reservoir with normal gas space in said container below the cover, and a projection on said duct extending upwardly through the interior of said collapsible reservoir and engaging the upper wall thereof to support said chamber above said cover.

5. In combination a storage battery having positive and negative plate groups in a container and a cover hermetically sealed to said container, a filling opening in said cover, a non-spill vent plug removably secured in said filling opening embodying a valve automatically closed by the tilting of the battery to a predetermined angle from the vertical, a second opening in said cover, a duct sealed in said opening and having one end communicating with the space above the electrolyte in said container and its opposite end projecting above said cover, a collapsible reservoir having a neck portion sealed in gas and fluid type manner to said opposite end of said duct, and a projection on said opposite end of said duct extending upwardly through said reservoir and engaging the upper wall thereof to support said chamber above said cover.

6. In combination a storage battery having positive and negative plate groups in a container and a cover hermetically sealed to said container, a filling opening in said cover, a non-spill vent plug removably secured in said filling opening embodying a valve automatically closed by the tilting of the battery to a predetermined angle from the vertical, a second opening in said cover, a duct extending through said opening and into said container and having one end terminating adjacent the bottom wall of said container and its opposite end above said container, a collapsible reservoir connected to said opposite end of said duct so that the interior of said reservoir and the interior of said container are in communication through said duct, and means for supporting said collapsible reservoir in its collapsed position.

7. In combination a storage battery having positive and negative plate groups in a container and a cover hermetically sealed to said container, a filling opening in said cover, a non-spill vent plug removably secured in said filling opening embodying a valve automatically closed by the tilting of the battery to a predetermined angle from the vertical, a sloping bottom wall in said container to define an area free from liquid electrolyte when said container is tilted, a second opening in said cover, a duct sealed in said second opening having one end extending beyond said cover and its opposite end terminating in said area formed by said sloping bottom wall, and a collapsible reservoir closed against escape of fluid to the external atmosphere supported on said battery externally thereto and connected to said end of said duct projecting beyond said cover so that the interior of said container and the interior of said reservoir are in communication through said duct, whereby upon tilting of said battery and the closing of the valve in said non-spill vent, gases accumulating in said area due to operation of said battery will flow into said reservoir to relieve the pressure developed in said battery and upon return of said battery to its normal position, said accumulated gases are discharged to the atmosphere by the opening of the valve in said non-spill vent plug.

8. In combination a storage battery cell assembled in a hermetically sealed container, a non-spill vent plug for said cell embodying a valve automatically closed by tilting of the battery to a predetermined angle from the vertical, and means for relieving the pressure produced in the interior of said cell when said valve of said non-spill vent plug is closed, said means comprising a reservoir bounded by flexible resilient walls and supported externally to the cell, and a duct for connecting the interior of said reservoir with the interior of said cell.

WILLIAM WHARTON SMITH.